(12) United States Patent
Kwakernaak (10) Patent No.: US 7,181,109 B2
(45) Date of Patent: Feb. 20, 2007

(54) PHOTONIC DEVICE AND METHOD FOR MAKING SAME

(75) Inventor: Martin H. Kwakernaak, New Brunswick, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 11/068,477

(22) Filed: Feb. 28, 2005

(65) Prior Publication Data

US 2005/0244103 A1    Nov. 3, 2005

Related U.S. Application Data

(60) Provisional application No. 60/579,383, filed on Jun. 14, 2004, provisional application No. 60/549,029, filed on Mar. 1, 2004, provisional application No. 60/549,024, filed on Mar. 1, 2004.

(51) Int. Cl.
*G02B 6/26* (2006.01)
*G02B 6/12* (2006.01)

(52) U.S. Cl. ............... 385/39; 385/15; 385/14; 385/50

(58) Field of Classification Search .............. None
See application file for complete search history.

(56) References Cited

U.S. PATENT DOCUMENTS 5,246,734 A    9/1993   Varaprath et al.
6,671,426 B2 *  12/2003  Litvin ................... 385/15
6,788,838 B2    9/2004   Ho
2004/0229539 A1 * 11/2004 Johnson et al. .......... 442/290

OTHER PUBLICATIONS

Lai, Q et al.: "Arbitrary Ratio Power Splitters Using Angled Silica on Silicon Multimode Interference Couplers" Electronics Letters, vol. 32, No. 17, Aug. 15, 1996, pp. 1576-1577, see entire document, Figure 1.
Heaton, J. et al. "General Matrix Theory of Self-Imaging in Multimode Interference (MMI) Couplers" IEEE Photonics Tech. Letters, vol. 11, No. 2, Feb. 1999, pp. 212-214, see entire document; cited in application.

* cited by examiner

*Primary Examiner*—Sung Pak
*Assistant Examiner*—Omar Rojas
(74) *Attorney, Agent, or Firm*—Lowenstien Sandler PC

(57) ABSTRACT

A monolithic device for photonically coupling a first optical waveguide to a second optical waveguide, including: an input being optically coupled to the first waveguide; a first portion being optically coupled to the input; a second portion being optically coupled to the first portion; and, an output being optically coupled to the second portion and the second waveguide; wherein, when an optical signal is provided on the first waveguide, a given part of the signal is provided to the second waveguide dependently upon an angle between the first and second portions. At least one of the waveguides may have an amorphous silicon material coating.

10 Claims, 12 Drawing Sheets

Fig. 15 ns and methods of making and using the same. Those of ordinary skill in the art will recognize that other elements are desirable and/or required in order to implement the present invention. However, because such elements are well known
PHOTONIC DEVICE AND METHOD FOR MAKING SAME

RELATED APPLICATIONS

This Application claims priority of U.S. patent application Ser. No. 60/549,029, filed Mar. 1, 2004, entitled MODIFIED MULTIMODE INTERFERENCE COUPLERS FOR ARBITRARY COUPLING RATIOS, Ser. No. 60/549,024, filed Mar. 1, 2004, entitled WAVEGUIDE ENCAPSULATION WITH HYDROGENATED AMORPHOUS SILICON NITRIDE, and Ser. No. 60/579,383, filed Jun. 14, 2004, entitled ELECTRO-REFRACTIVE LOW LOSS MMI-COUPLED RING RESONATORS, the entire disclosure of each of which is hereby incorporated by reference as if being set forth in its entirety herein.

GOVERNMENT RIGHTS

The invention was made with U.S. government support, and the U.S. Government has certain rights in the invention, as provided for by the terms of Contract number F30602-00-C-0116 and DAAD 17-02-C-0094 (DARPA) awarded by the U.S. Army Research Laboratory.

FIELD OF INVENTION

The present invention relates generally to optical systems, and more particularly to photonic devices.

BACKGROUND OF THE INVENTION

Micro-optic ring resonators are attractive for active and passive micro-optical circuits. Rings and discs with directional couplers have generally been realized in lateral and vertical geometries. Coupling of ring resonators with multi-mode interference (MMI) couplers has been demonstrated with ridge-type waveguides on InP. Switching has been demonstrated in active discs using electro-absorption.

It is believed to be desirable to provide devices exhibiting lower losses and good reliabilities.

SUMMARY OF INVENTION

A monolithic device for photonically coupling a first optical waveguide to a second optical waveguide, including: an input being optically coupled to the first waveguide; a first portion being optically coupled to the input; a second portion being optically coupled to the first portion; and, an output being optically coupled to the second portion and the second waveguide; wherein, when an optical signal is provided on the first waveguide, a given part of the signal is provided to the second waveguide dependently upon an angle between the first and second portions. At least one of the waveguides may have an amorphous silicon material coating.

BRIEF DESCRIPTION OF THE FIGURES

Understanding of the present invention will be facilitated by consideration of the following detailed description of the preferred embodiments taken in conjunction with the accompanying drawings, wherein like numerals refer to like parts and.

DETAILED DESCRIPTION OF THE PREFERRED EMBODIMENTS

It is to be understood that the figures and descriptions of the present invention have been simplified to illustrate elements that are relevant for a clear understanding of the present invention, while eliminating, for purposes of clarity, many other elements found in typical optical systems and methods of making and using the same. Those of ordinary skill in the art will recognize that other elements are desirable and/or required in order to implement the present invention. However, because such elements are well known in the art, and because they do not facilitate a better understanding of the present invention, a discussion of such elements is not provided herein.

According to an aspect of the present invention, multi-mode interference (MMI) couplers with arbitrary coupling ratios may be provided, and a method for making the same is provided. According to an aspect of the present invention, optical waveguides may be at least partially coated, e.g., encapsulated, to improve their performance. An amorphous silicon (α-Si) material may be used to encapsulate the guides. According to an aspect of the present invention, electro-refractive modulation may be used in combination with ring resonators. MMI couplers may be used to provide reproducible coupling ratios, which may be particularly useful in electro-optic applications or when the resonators are used. in optical filters.

Figure 1A:
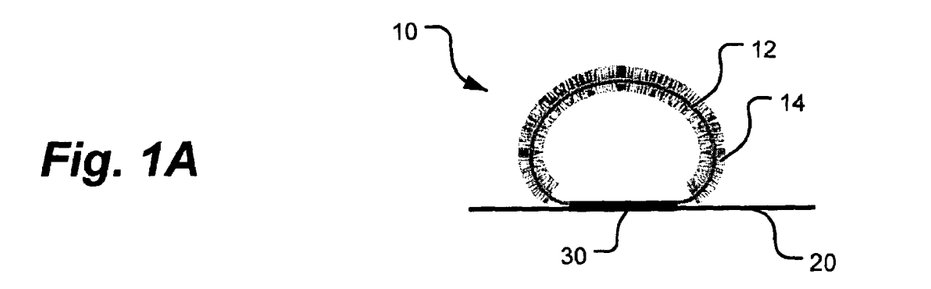
FIG. 1A illustrates a ring resonator according to an aspect of the present invention.
Figure 1B:
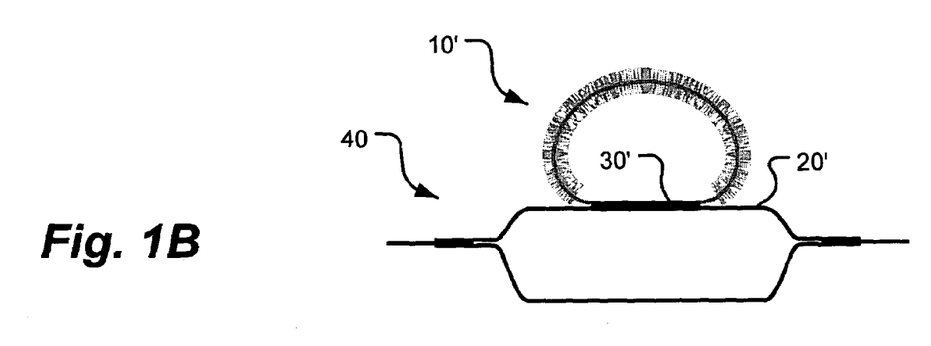
FIG. 1B illustrates a Mach-Zehnder interferometer with a ring resonator in one arm according to an aspect of the present invention.
Figure 1C:
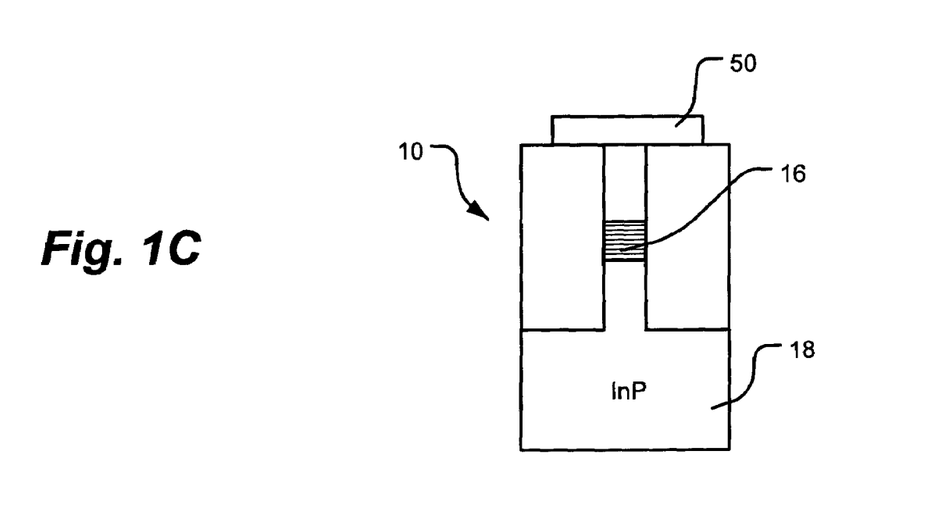
FIG. 1C illustrates a deeply etched waveguide structure according to an aspect of the present invention.

Referring now to FIGS. 1A–1C, there is shown a ring resonator device 10. Resonator 10 generally includes a closed optical loop 12 being operably responsive to electrode 14. Signals may be coupled between resonator 10 and waveguide 20 via a coupler 30, such as a multi-mode interference (MMI) based coupler.

Figure 2A:
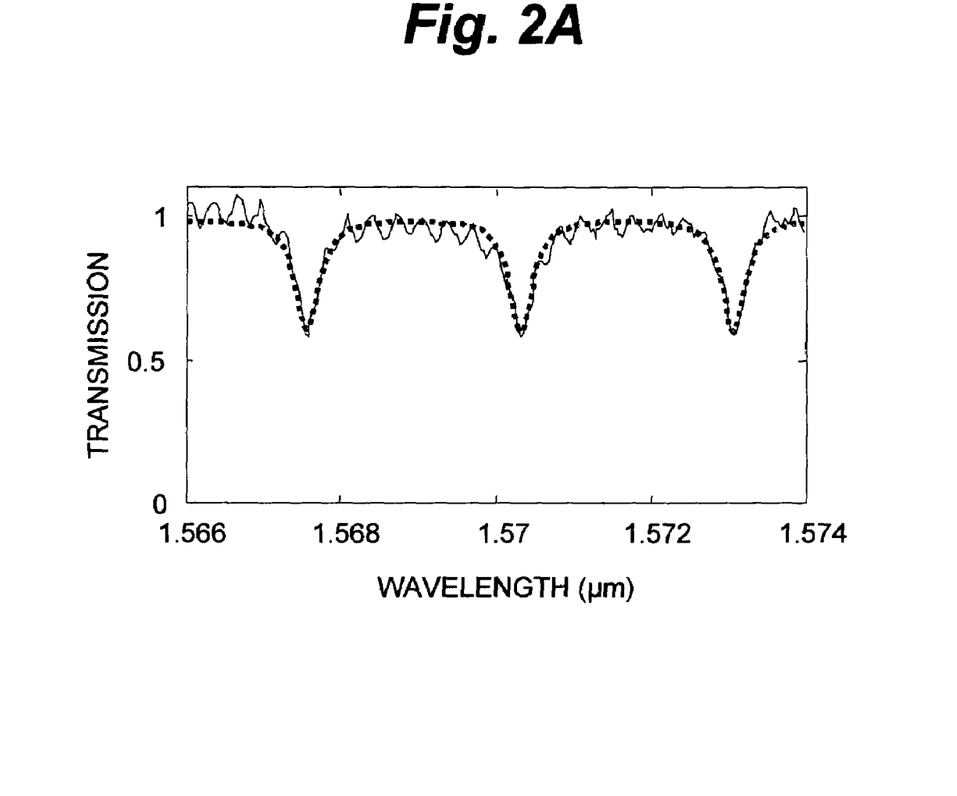
FIG. 2A illustrates transmission characteristics of a ring resonator, such as that illustrated in FIG. 1A.
Figure 2B:
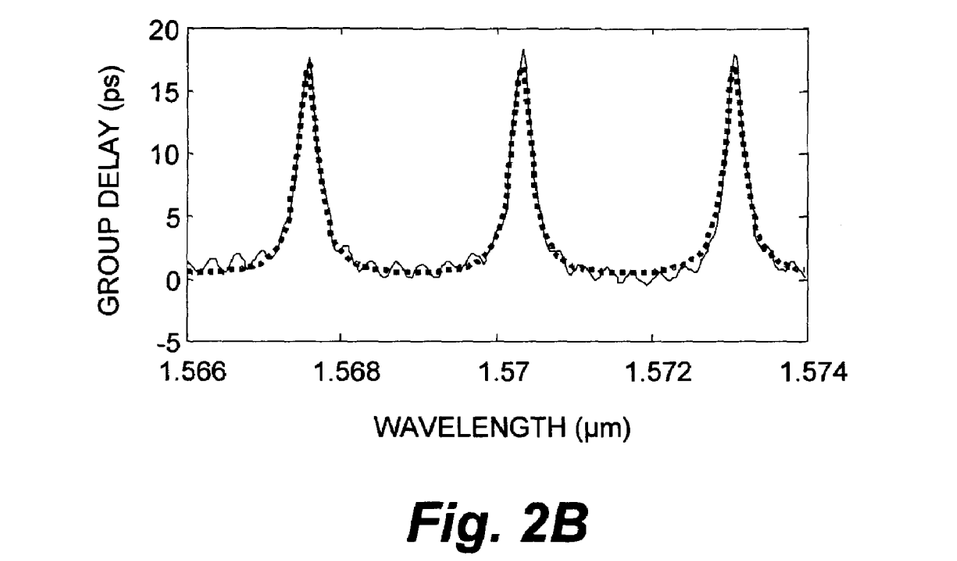
FIG. 2B illustrates a group delay characteristic of a ring resonator, such as that illustrated in FIG. 1A.

FIG. 2A–2B illustrate transmission and group delay characteristics, respectively, of an analogous resonator 10' coupled to an analogous waveguide 20' by an analogous MMI based coupler 30', where waveguide 20' in included as an arm in a Mach-Zehnder interferometer 40.

Referring now to FIGS. 1A–1C and 3A–3B, ring resonator 10 may be composed of an InGaAsP/InP material system, include about 25 quantum wells 16 and have a photoluminescence wavelength of about 1415 nm, by way of non-limiting example only. Waveguide 20 may take the form of a deeply etched waveguide (about 4 μm) and have a width of about 0.8 μm. MMI coupler 30 may have dimensions on the order of about 2.7 μm×34.5 μm. Coupler 30 may be used to couple into ring 10 with a cross-coupling ratio of 85.4% or 50%, which ring may have a circumference of about 250 μm. However, an MMI based coupler according to a aspect of the present invention may be used to provide for arbitrary coupling ratios as well. Ring 10, waveguide 20 and coupler 30 may be defined using direct e-beam patterning and inductively coupled plasma (ICP) etching, for example.

Ring resonator 10, waveguide 20 and/or MMI coupler 30 may be coated with a dielectric 50, such a Cytop brand dielectric available from Asahi Glass Company. Electrical contacts 14 may be formed on top of the ring-waveguide 10 and to the n-substrate 18 to enable modulation. Optical losses may be on the order of about ~1 cm$^{-1}$.

Referring now also to FIG. 2, there is shown a transmission and group delay of a ring resonator, such as resonator 10 of FIGS. 1A–1C. Transmission may be measured with a tunable laser and the group delay extracted with a modulation phase shift method. The dashed curves fit to the measured data. The resonator quality factor Q is 4500. The transmission and group-delay data allows unambiguous determination of coupling and loss, which are 51% and 8.5% (0.4 dB) per ring revolution, respectively. In this (over-coupled) regime, the ring resonator Q is determined by the coupling coefficient rather than the loss, and is thus defined by the design.

Figure 3A:
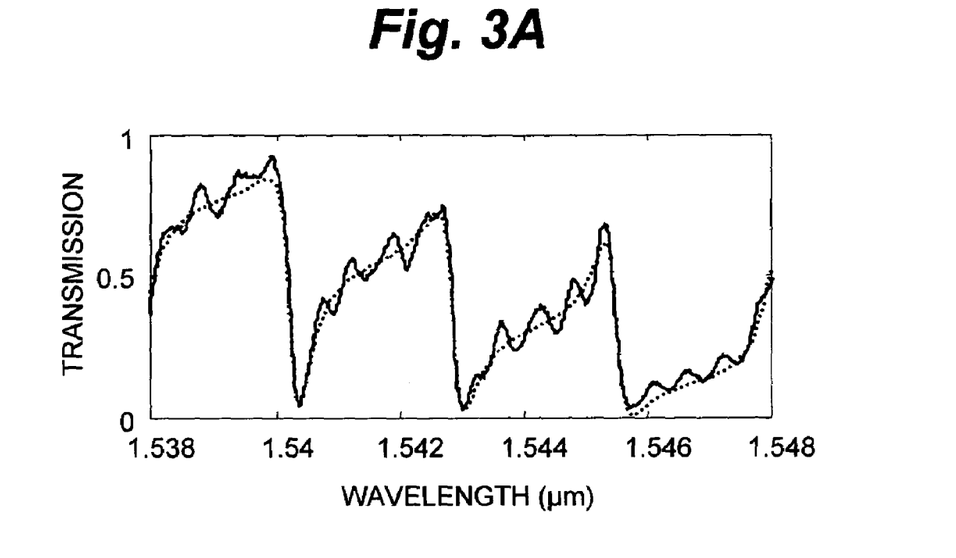
FIG. 3A illustrates a transmission characteristic of a Mach-Zehnder interferometer with a ring-resonator in one arm, such as that illustrated in FIG. 2A.
Figure 3B:
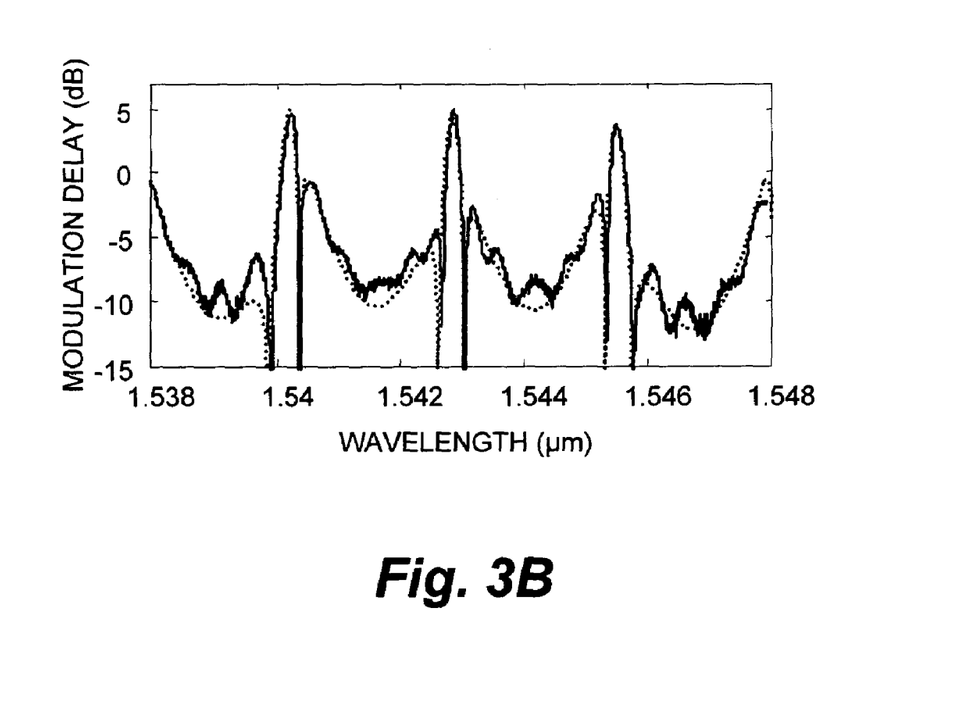
FIG. 3B illustrates a modulation gain (i.e., modulation efficiency as compared to that of a straight waveguide of length equal to the ring circumference) of a Mach-Zehnder interferometer with a ring-resonator in one arm, such as that illustrated in FIG. 2A.

Referring now also to FIG. 3A, there is shown a transmission of an interferometer with a ring resonator in one arm, such as interferometer 40 of FIG. 1B. Index modulation of the ring resonator may result in an enhanced phase modulation of one interferometer arm. Modulation response of the configuration is shown in FIG. 3B, where the ring resonator is reverse biased, and a 1 GHz sine-signal is applied. The modulation depth of the signal may be retrieved with a network analyzer, while the wavelength is scanned.

According to an aspect of the present invention, an arbitrary coupling MMI based coupler may be used for splitting and directing light in integrated devices, such as Mach-Zehnder interferometers (FIG. 2), optical waveguide filters, and ring-resonators (FIG. 1), all by way of non-limiting example only. Further, large scale integrated photonic circuits may incorporate such couplers, which are well suited to split and couple the light in a controllable and repeatable fashion.

One may recognize that conventional directional couplers and multi-mode interference couplers (MMI) may typically be used for splitting and directing light in integrated devices. However, directional couplers are typically sensitive to geometrical dimensions (gaps between the waveguides) and therefore tend to have generally irreproducible coupling ratios. This is particularly true for waveguide platforms, which involve narrow, highly confined waveguides—waveguide types suitable for narrow bends required in ultra-compact devices. Conventional multi-mode interference couplers also present drawbacks, such as only having select coupling ratios (50%:50% or 14.6%:85.4%).

Figure 4:
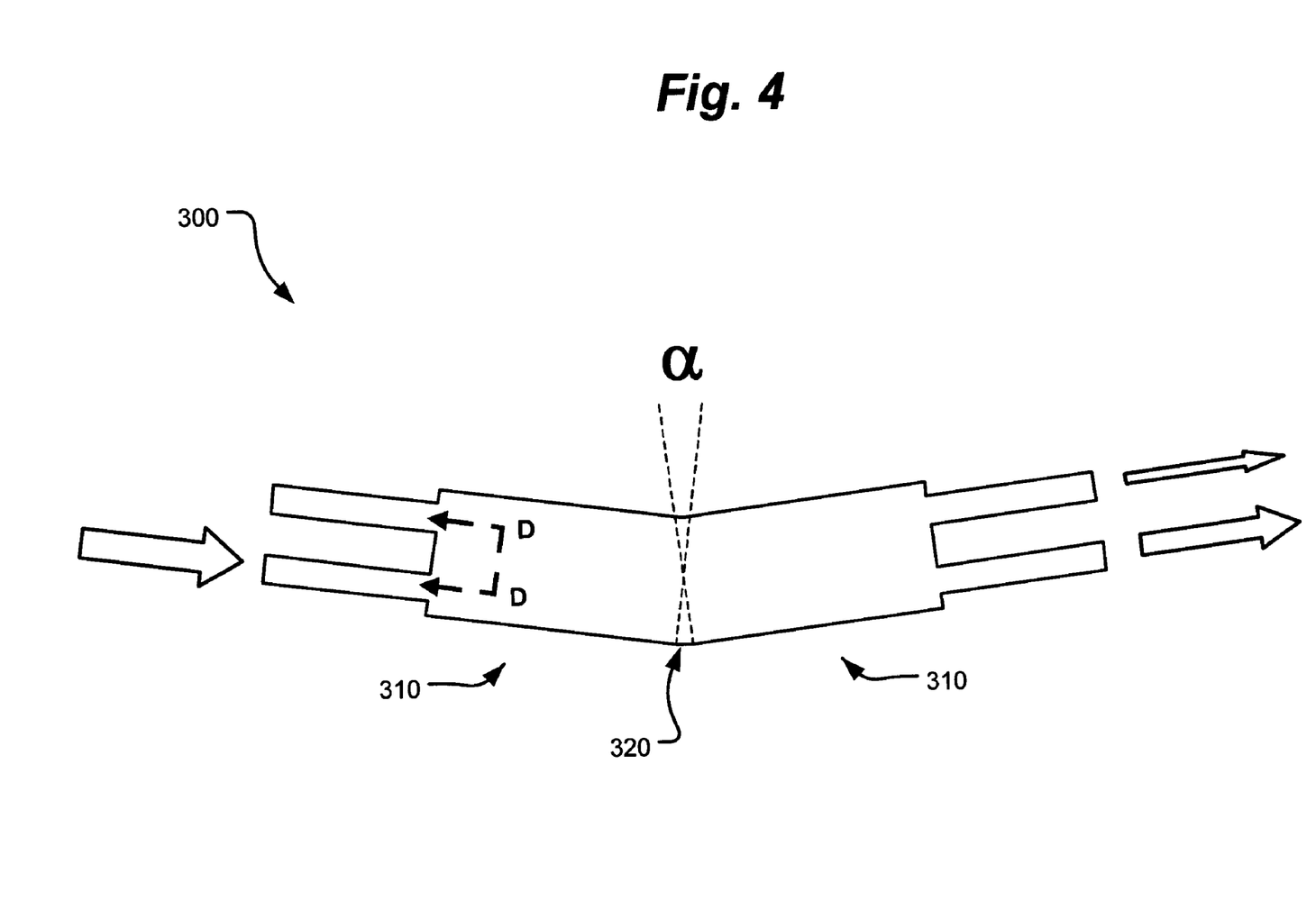
FIG. 4 illustrates a schematic of an angled MMI suitable for use with the devices of FIGS. 1A, 1B and 1C according to an aspect of the present invention.

Referring now also to FIG. 4, according to an aspect of the present invention, an MMI based 2×2 coupler 300 may be used to provide coupling ratios beyond those typically obtained with MMI's. Coupler 300 may be based on two MMI couplers 310, which each provide a coupling ratio of 14.6%:85.4%. The dimensions of each MMI 310 may be designed according to J. H. Heaton, R. M. Jenkins, "General Matrix Theory of Self-imaging in Multimode Interference (MMI) Couplers", IEEE Photonics Technology Letters, 11(2): 212–214 (1999), to provide an N=3, Q=2 coupler, by way of non-limiting example only. According to an aspect of the present invention, two MMI couplers 310 may be cascaded in series at a small angle α to provide a coupler 300 with a coupling ratio that depends upon the angle α at the joint between MMI couplers 310.

When α is 0 degrees, coupler 300 is functionally equivalent to a 50%:50% MMI coupler; a coupler widely used in planer optical circuits. When an angle other than 0 is present, however, arbitrary coupling ratios may be provided in a package no larger the 50%:50% coupler (N=3, Q=4 coupler).

By way of further, non-limiting example only, the transfer function of the (N=3, Q=2) MMI coupler is given by J. H. Heaton, R. M. Jenkins, "General Matrix Theory of Self-Imaging in Multimode Interference (MMI) Couplers", IEEE Photonics Technology Letters, 11(2):212–214(1999) as:

$$T_{3,2} = \frac{1}{2}\begin{bmatrix} \sqrt{2-\sqrt{2}} \cdot e^{j\frac{5}{8}\pi} & \sqrt{2+\sqrt{2}} \cdot e^{j\frac{1}{8}\pi} \\ \sqrt{2+\sqrt{2}} \cdot e^{j\frac{1}{8}\pi} & \sqrt{2-\sqrt{2}} \cdot e^{j\frac{5}{8}\pi} \end{bmatrix} \quad (1)$$

The angled region 320 between the two (N=3, Q=2) MMIs 310 provides a phase-difference to the connecting ports. The corresponding transfer matrix is:

$$T_\alpha = \begin{bmatrix} \exp(j\varphi) & 0 \\ 0 & \exp(-j\varphi) \end{bmatrix} \quad (2)$$

with $$\varphi = \frac{2\pi}{\lambda} n_{eff} \sin(\alpha) \frac{d}{2},$$

where α is the joint angle, d is the separation of the waveguides where they enter the MMI section (center to center separation), $n_{eff}$ is the effective slab index and λ is the wavelength.

The transfer matrix, which characterizes the entire coupler, is given by:

$$T = T_{3,2} \cdot T_\alpha \cdot T_{3,2} = \quad (3)$$

$$e^{j\frac{\pi}{4}} \begin{bmatrix} \frac{\sqrt{2}}{2} \cos(j\varphi) - j\sin(j\varphi) & \frac{\sqrt{2}}{2} \cos(j\varphi) \\ \frac{\sqrt{2}}{2} \cos(j\varphi) & \frac{\sqrt{2}}{2} \cos(j\varphi) - j\sin(j\varphi) \end{bmatrix}.$$

The power-coupling coefficients are given by:

$$|T|^2 = \frac{1}{4} \begin{bmatrix} (3-\cos(2\varphi)) & (1+\cos(2\varphi)) \\ (1+\cos(2\varphi)) & (3-\cos(2\varphi)) \end{bmatrix}. \quad (4)$$

The bar-coupling is ¼(3−cos(2φ)) and the cross coupling is ¼(1+cos(2φ)). Accordingly, these values may be chosen to be in the range of about 0% to 50% (for cross coupling) by selecting a corresponding angle α.

Figure 5:
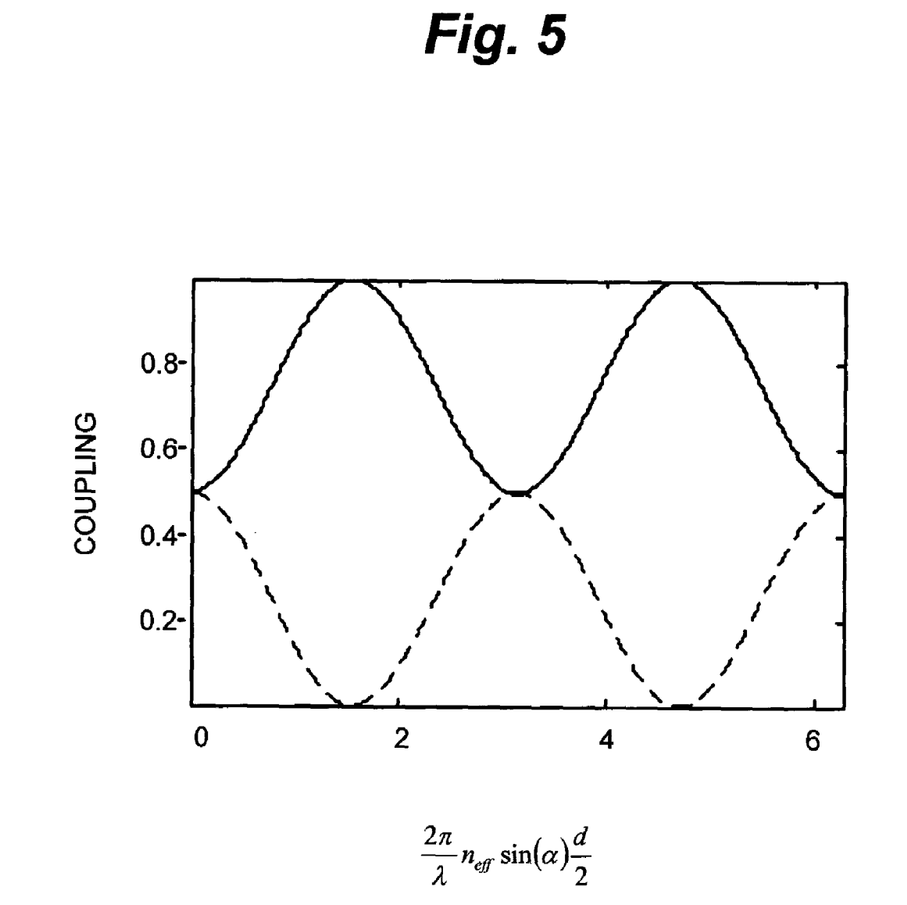
FIG. 5 illustrates bar (solid) and cross (dashed) transmissions of an angled MMI, such as that shown in FIG. 4.

Referring now also to FIG. 5, there are shown power coupling values as a function of Φ, for bar coupling and cross coupling of a 2×2 MMI with an angled joint, such as that shown in FIG. 4.

Figure 6:
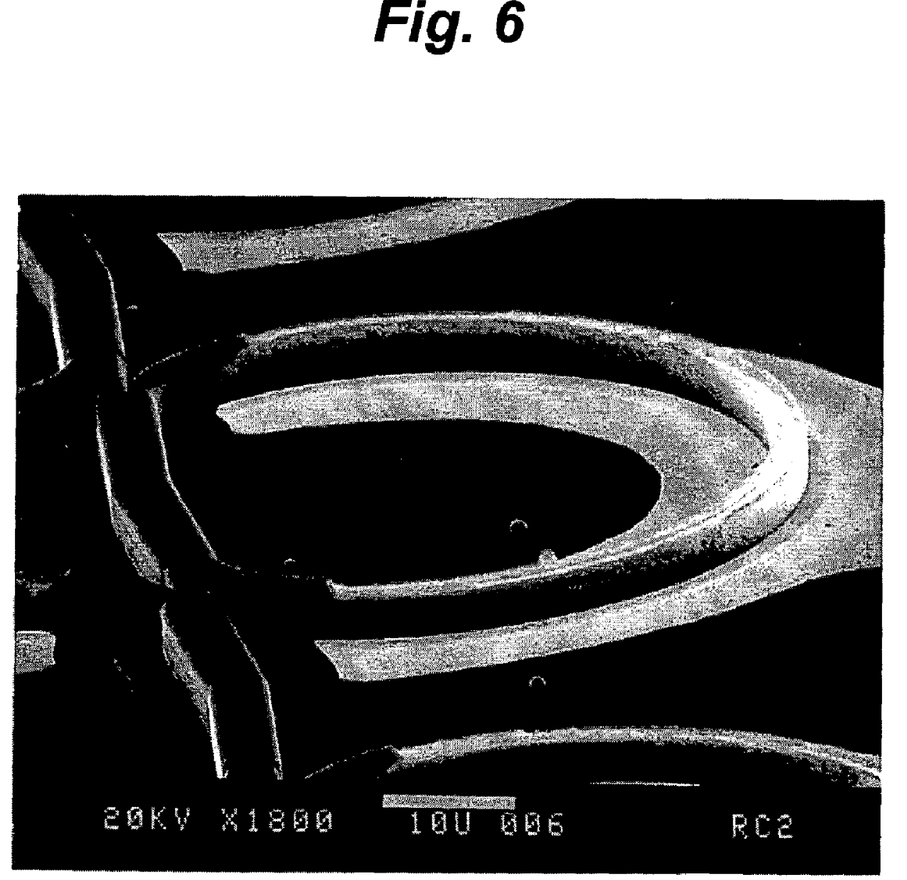
FIG. 6 illustrates an SEM representation of ring-resonators coupled with angled MMIs to access waveguides according to an aspect of the present invention.
Figure 7:
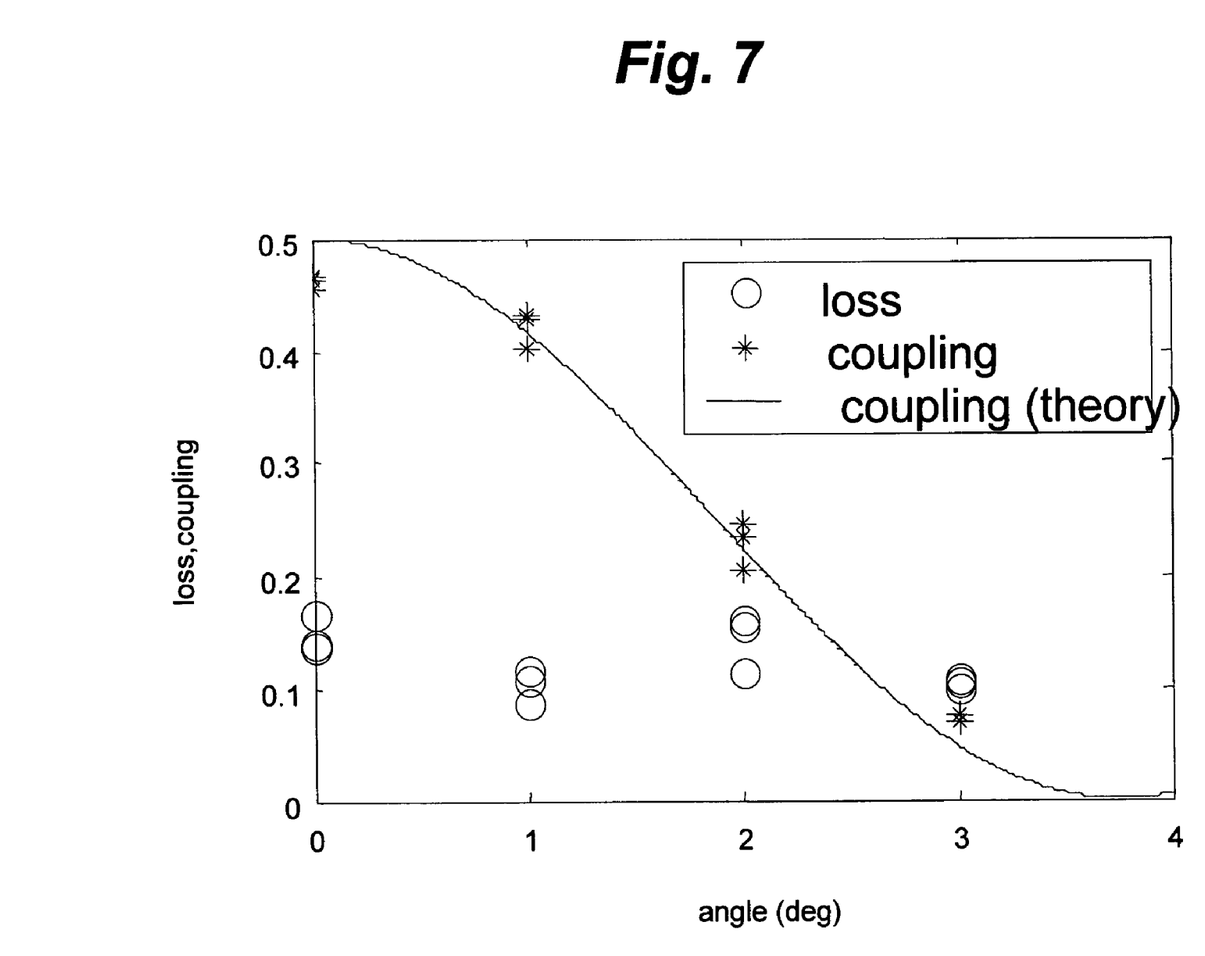
FIG. 7 illustrates coupling values for ring-resonators coupled with angled MMIs to access waveguides according to an aspect of the present invention.

Referring now also to FIG. 6, there is shown an SEM image of ring-resonators coupled to an access waveguide with arbitrary coupling ratio couplers. The illustrated ring resonators and waveguides may be analogous to those discussed with regard to FIGS. 1A–1C. The illustrated MMI based coupler may be analogous to that discussed with regard to FIG. 4. Exemplary values for coupling and resonator losses associated with the construction of FIG. 6 are shown in FIG. 7. Resonator losses, which include one pass waveguide loss and excess coupler-loss, are about 10%. The dependence of coupling values on the intra-coupler joint angle is consistent with that discussed herein, such as is shown in FIG. 5.

According to an aspect of the present invention, amorphous silicon (α-Si) materials may be used to provide semiconductor waveguides with improved loss and bending properties. According to an aspect of the present invention, amorphous silicon (α-Si) materials, including α-Si:H based materials, may be used to provide for better performing waveguide type devices. For example, waveguides and lasers with tailored spot-shape and properties may be provided. According to an aspect of the present invention, α-Si material may be used to encapsulate waveguides so as to improve the performance thereof. Such a material has a selectable refractive index (n), that may be selected so as to achieve the desired performance improvement.

By way of non-limiting example, the amorphous silicon (α-Si) material may take the form of α-SiC$_x$ where 0<x<1, α-SiN$_y$ where 0<y<1.33, α-SiO$_z$ where 0<z<2 and α-SiGe$_w$ where 0<w<1. Hydrogenated or fluorinated materials may be used.

Figure 9:
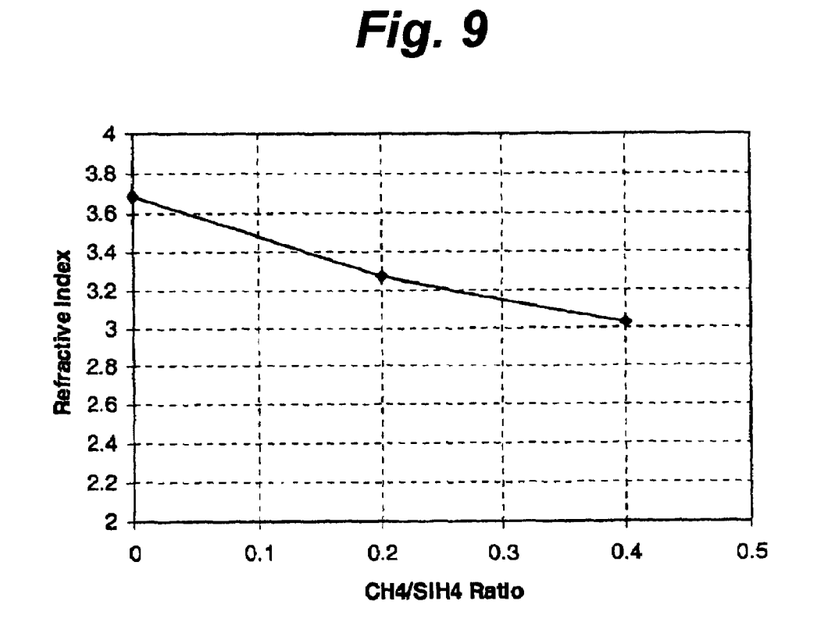
FIGS. 9 and 10 illustrate charts presenting achievable refractive indices as a function of a ratio of source gases used in a PECVD process.
Figure 10:
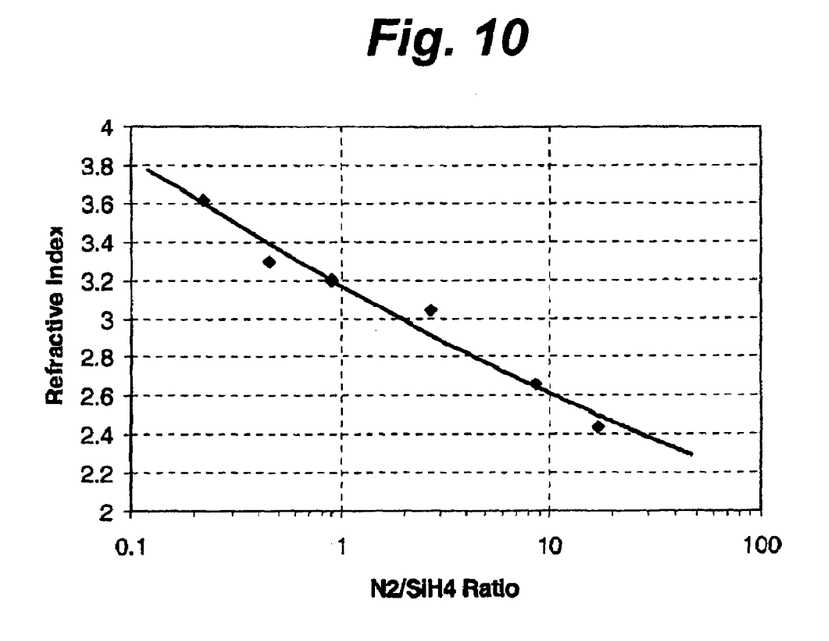

By way of further non-limiting example only, and referring now also to FIG. 9, there is shown a chart illustrating achievable refractive indices as a function of a ratio of CH$_4$ to SiH$_4$ used in a plasma enhanced chemical vapor deposition (PECVD) process to form a coating including α-SiC$_x$. Referring now also to FIG. 10, there is shown a chart illustrating achievable refractive indices as a function of a ratio of N$_2$ to SiH$_4$ used in a PECVD process to form a coating including α-SiN$_y$. Reference may be drawn to U.S. Pat. No. 6,788,721, entitled PHOTONIC INTEGRATED CIRCUIT (PIC) AND METHOD FOR MAKING SAME, the entire disclosure of which is hereby incorporated by reference herein, for more information regarding tuning the refractive index of α-Si based materials. The present invention will be further discussed as it relates to α-SiN$_x$:H, for non-limiting purposes of explanation only. Other materials may be used though.

Figure 8:
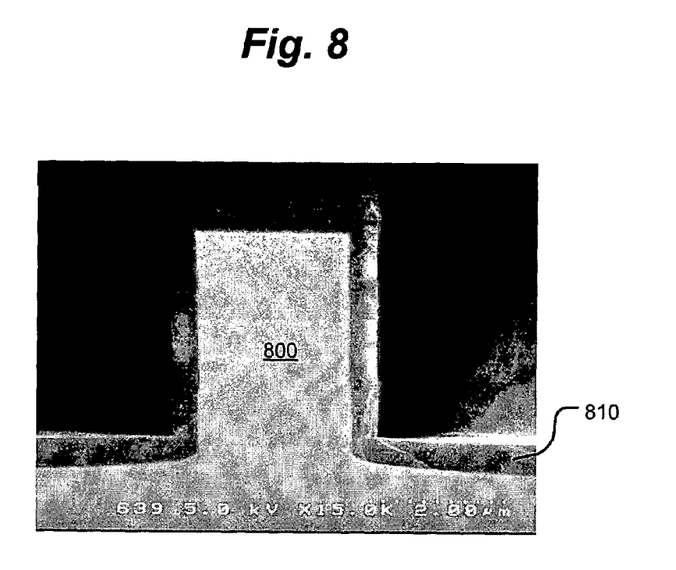
FIG. 8 illustrates an SEM cross-section image of deeply etched InGaAsP/InP waveguide encapsulated with hydrogenated amorphous silicon nitride according to an aspect of the present invention.

Referring now also to FIG. 8, PECVD deposited hydrogenated amorphous silicon nitride 810 may be used as a semiconductor waveguide 800 encapsulation to provide increased design flexibility and better performance of semiconductor waveguide based photonic circuits, such as those discussed with regard to FIGS. 1–7 hereof. Waveguide 820 may take the form of an InGaAsP/InP based waveguide, for example. By way of further example, resonator 10, waveguide 20 and/or coupler 30 or 300 (FIGS. 1A–1C, 4) may be at least partially encapsulated with an amorphous silicon based material, such as hydrogenated amorphous silicon nitride.

Hydrogenated amorphous silicon nitride (α-SiN$_x$:H) can provide a refractive index of about 2 to about 3.7, with low optical absorption at telecommunication wavelengths (1300 nm, 1550 nm windows). This range of refractive indices is not typically covered by traditional materials used for semiconductor waveguide encapsulation/passivation, such as silicon oxide/nitride, polymers and Benzocyclobutene (BCB). Using α-SiN$_x$:H as a complementary material to form semiconductor-based waveguides is particularly attractive due to the large refractive index range that can be exploited. Choice of the refractive index of a waveguide encapsulation material over the achievable index range provides a valuable design tool for waveguide and photonic devices. Further, α-SiN$_x$:H can be deposited over semiconductor structures using plasma enhanced chemical vapor deposition (PECVD) at low temperatures (200 deg C.), for example.

Figure 11:
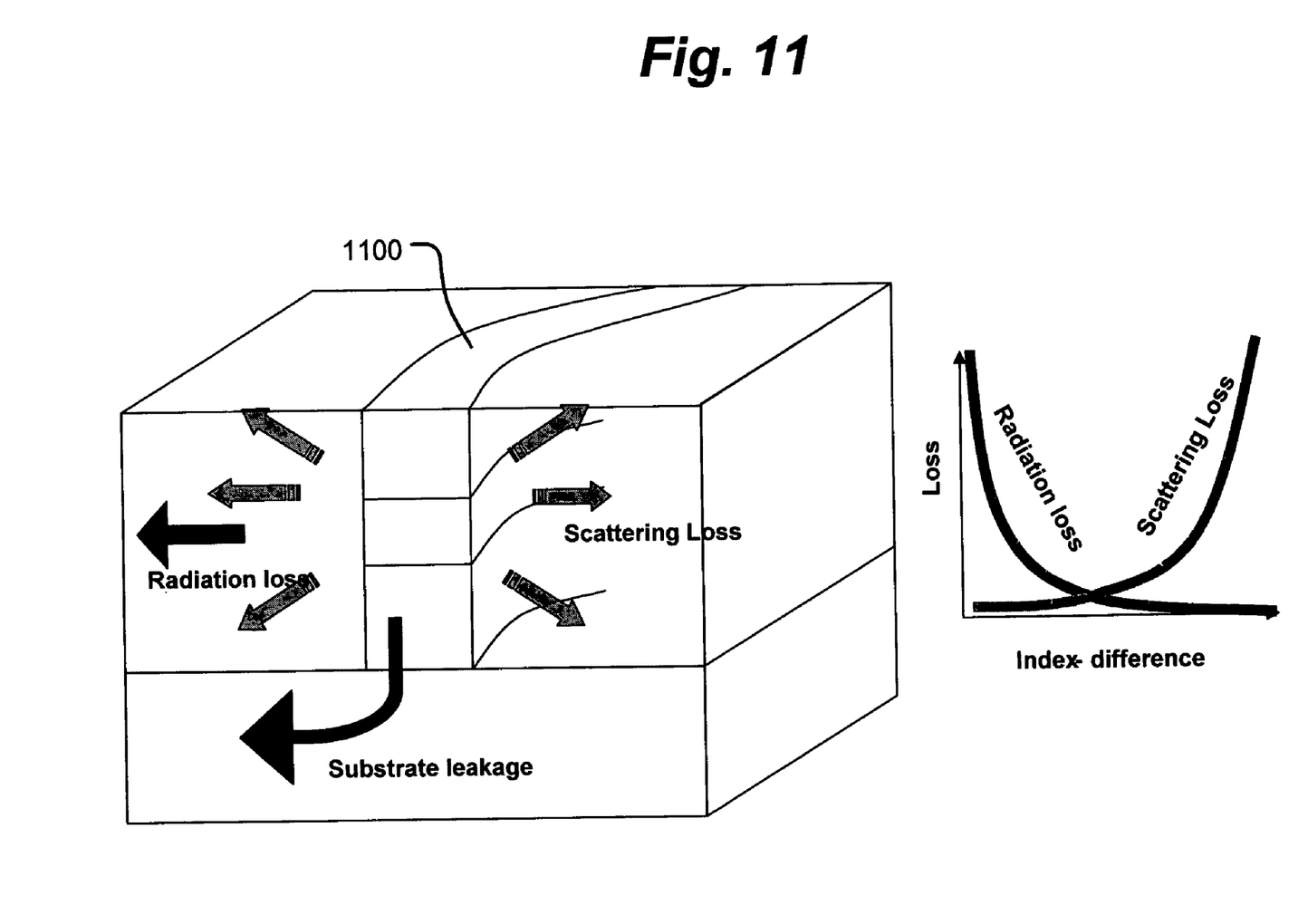
FIG. 11 illustrates a schematic of sources of loss in waveguides.

Referring now also to FIG. 11, semiconductor waveguides 1100 made of III–V semiconductors such as InGaAsP/InP typically provide guiding of the light in the vertical dimensions due to proper design of the epitaxially grown layer structure. Lateral guiding is obtained by etching the structure to a certain depth. The lateral guiding properties are typically determined by etch depth, waveguide shape and the refractive indices of the remaining semiconductor and surrounding material. According to an aspect of the present invention, encapsulation of semiconductor waveguide 1100 with an α-Si based material, such as α-SiN$_x$:H, provides for better and direct control of the lateral guiding properties dependently upon the selectable refractive index of the α-Si based material.

Figure 12:
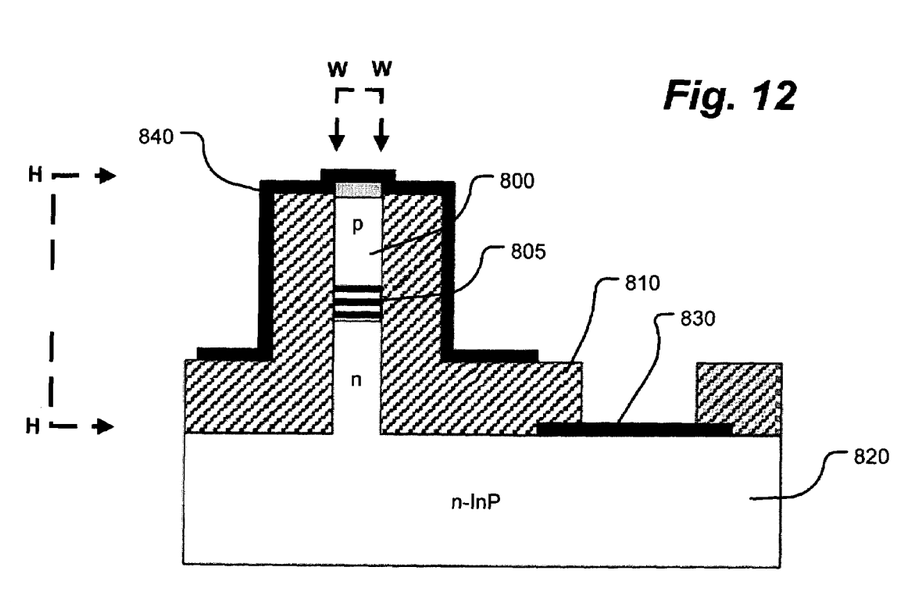
FIG. 12 illustrates a deeply etched InGaAsP/InP waveguide with $\alpha$-SiNx:H encapsulation and contacts to the p- and n-side of the waveguide junction according to an aspect of the present invention.

Referring again to FIG. 8 and now also to FIG. 12, there are shown a deeply etched InGaAsP/InP waveguide 800 with an α-SiN$_x$:H encapsulation layer 810. The semiconductor is etched entirely through an epitaxially grown vertical waveguide structure. Lateral guiding is determined by the waveguide width W—W and the $\alpha$-SiN$_x$:H layer 820 refractive index value. Using this geometry, one may design single-mode waveguides dependently upon the $\alpha$-SiN$_x$:H refractive index, that are wider and more practical than single mode waveguides obtained with traditional encapsulation materials with indices below 2 (which typically require waveguides narrower than about 0.4 μm).

According to an aspect of the present invention, deeply etched waveguides can provide a platform for compact photonic circuits due to achievable tight bending radii, which can be obtained with negligible optical loss. Bending radii around 4 μm and larger may generally be used with refractive indices in the range of about 2 to about 3.7 to enable low loss waveguides.

Tighter bending radii may be used, but scattering losses resulting from sidewall roughness and the use of encapsulation indices below 2 may result. Scattering loss scales approximately with $\Delta n^2$, where $\Delta n$ is the difference of the effective index of the vertical mode in the semiconductor and the encapsulation material. A choice of n=2.65 as opposed to n=2 will reduce the scattering loss four times, and provide for waveguide bends around 8 μm, for example.

Referring still to FIG. 12, waveguide 800 may include quantum wells 805 between p- and n-type regions, and be formed on an n-InP substrate 820 having an n-contact 830. A p-contact 840 may also be provided. By way of further, non-limiting example only, waveguide width W—W may be on the order of about 1 μm, where waveguide height H—H is on the order of about 4 μm.

Further yet, the performance of waveguide based photonic components, such as MMI-couplers (30, 300, FIGS. 1A–1C, 4), are typically sensitive to the dimensions of the fabricated devices. Fabrication errors, which are generally inevitable, and even tolerances, thus result in performance degradation or differences. In the case of MMI-couplers, the width of the MMI waveguide is typically the most sensitive dimension. The performance of the device is determined by the effective width of the guide. According to an aspect of the present invention, penetration of the optical field into a surrounding dielectric material, which results in an effective width wider than the physical width of the device, may be leveraged. This effect is called the Goos-Hanchen shift. The magnitude of the Goos-Hanchen shift is determined by the index difference of the waveguide material and the encapsulating dielectric index.

Figure 16:
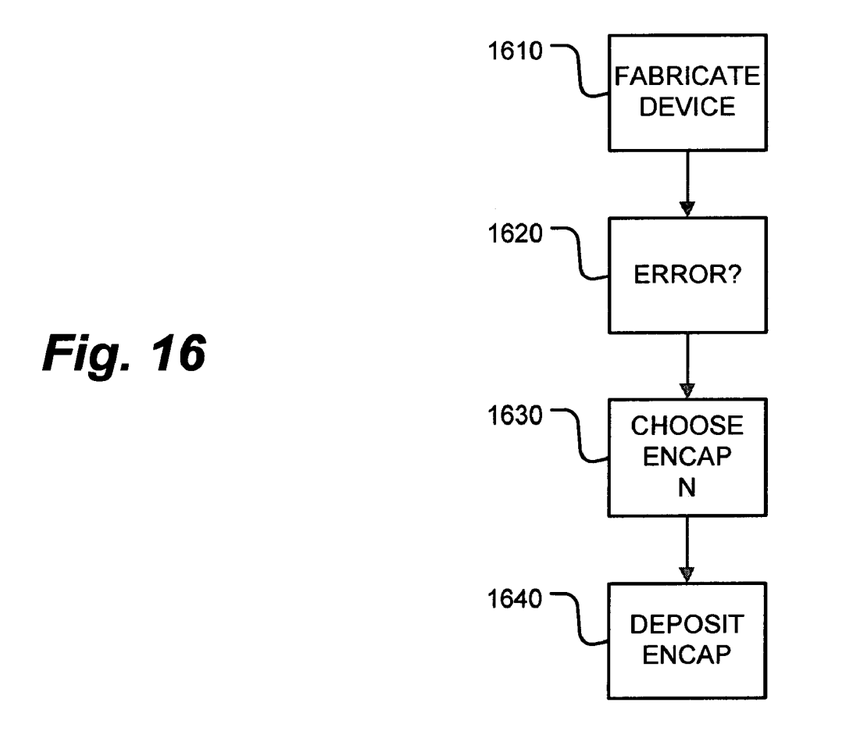

Referring now also to FIG. 16, there is shown a process according to an aspect of the present invention. Where a deviation in a characteristic of a fabricated device differs from the target characteristic, one may compensate for the difference by tuning the encapsulating material index value. The index can be adjusted such that a Goos-Hanchen shift will be obtained which results in an effective waveguide width closer to that originally targeted. Again, $\alpha$-Si materials may be used as the encapsulating material.

According to an aspect of the present invention, the core device may be fabricated 1610. A difference between a design characteristic of the device and the actual fabricated device may then be determined 1620. The index value can be determined 1630 after fabrication 1610, e.g., etching the waveguides, dependently upon the determined difference 1620. For example, the width of a fabricated MMI may be compared for a target width, and a refractive index for an encapsulating $\alpha$-Si material chosen to facilitate high performance devices and performance repeatability, even in the case of limited width control and repeatability during fabrication. The encapsulated material may be of any suitable thickness, such as 0.5–1 μm thick.

According to an aspect of the present invention, ring-resonator modulator arrays for wavelength division multiplexing (WDM) applications may be provided to facilitate reduced size, power consumption and cost. The resonant cavity of the ring resonator results in a substantial decrease of the $V_\pi$ of the modulator for a given electrode length. As a consequence, compact devices with low electrical parasitics can be used for efficient modulation. The wavelength selective nature of the resonators allows modulation at one or multiple, specific wavelengths without requiring filtering devices, such as AWG's.

The ring resonators may be based on deeply etched 1 μm wide waveguides on InGaAsP/InP (e.g., FIGS. 1A–1C, 8, 12). Smooth, highly vertical etched sidewalls may be used to provide for low optical losses. Etching that provides for good vertical wall smoothness, and that may be suitable for use with the present invention, is described in "CHARACTERIZATION OF SIDEWALL ROUGHNESS OF INP/INGAASP ETCHED USING INDUCTIVELY COUPLED PLASMA FOR LOW LOSS OPTICAL WAVEGUIDE APPLICATIONS", J. Vac. Sci. Technol. B 21,6, November/December 2003. A quantum-well active region analogous to that presented in U.S. patent application Ser. No. 10/792, 585, entitled, IN-P PHASE MODULATORS AND METHODS FOR MAKING AND USING THE SAME, the entire disclosure of which is also hereby incorporated by reference herein, may be used to provide a high dn/dV.

Accurate control over the coupling value to the access waveguide (e.g., FIGS. 1A–1B) may be provided for device designs involving multiple rings (e.g., FIG. 6), allowing one to obtain specific filter functions or multi-wavelength resonator arrays, for example. A coupler (FIGS. 1A, 1B, 4) may include two cascaded MMI sections, which join at a small angle (FIG. 4). Each section may take the form of a 2×2 MMI with a coupling ratio of 14.6%:85.4%. The coupling ratio of the combined coupler may be selected by the angle at the joint. This MMI scheme results in reproducible arbitrarily selectable coupling ratios and does not require the elaborate processing associated with vertical coupling schemes.

Figure 13:
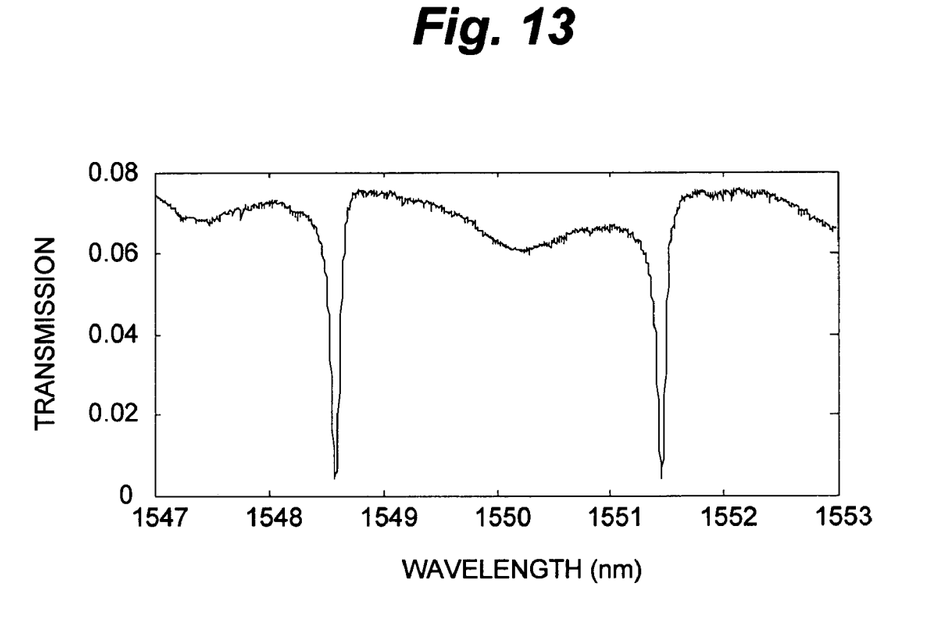
FIG. 13 illustrates transmission characteristics of a ring resonator having the structure shown in FIG. 12.

Referring now also to FIG. 13, there is shown an optical transmission of a ring resonator with a quality factor of 20,000 and a finesse of 36. The ring circumference is 200 μm and the coupling to the access waveguide is 7%. Values for the coupling and resonator losses are shown FIG. 7.

Figure 14:
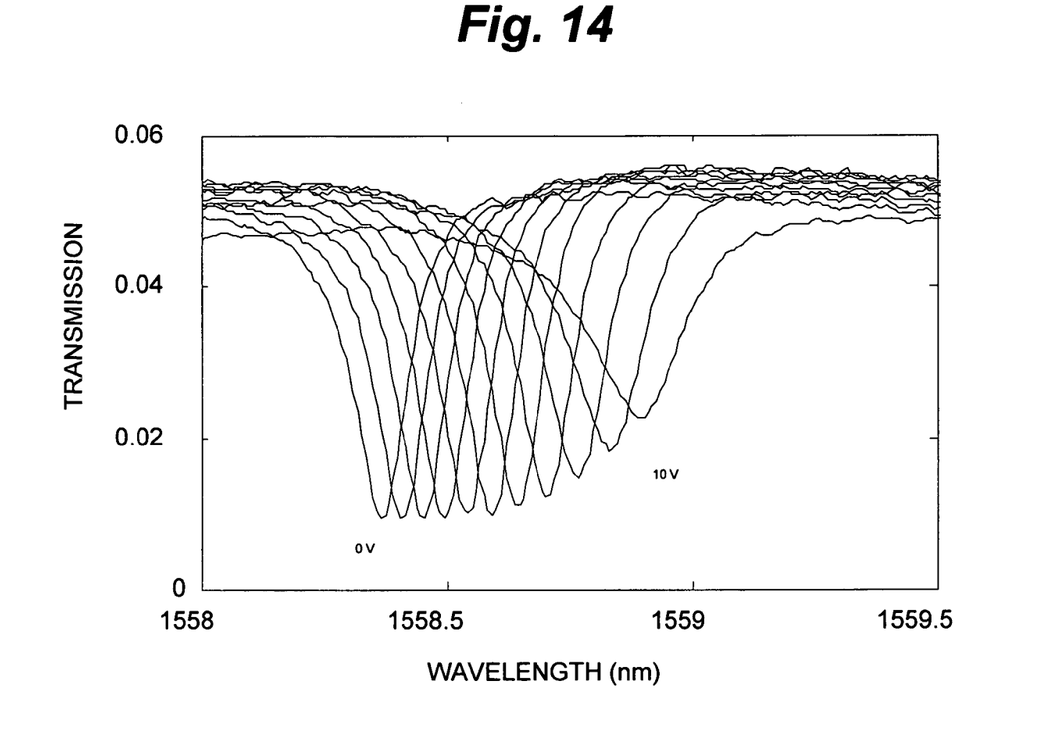
FIG. 14 illustrates a tuning of the resonance of a ring resonator having the structure shown in FIG. 12 in 1 V increments.
Figure 15:
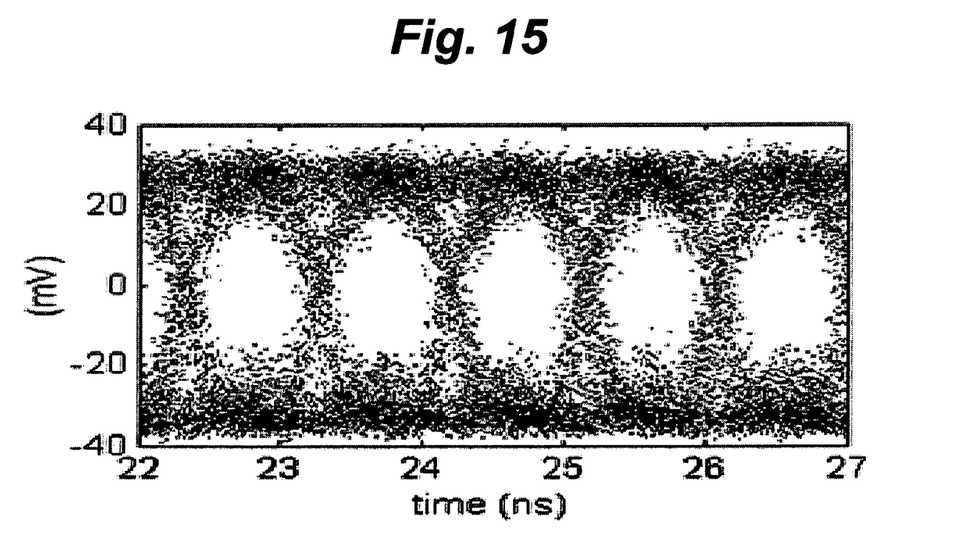
FIG. 15 illustrates an eye diagram of a link with a ring resonator modulator; and, FIG. 16 illustrates a block-diagrammatic representation of a process according to an aspect of the present invention.

Referring now also to FIG. 14, there is shown an electro-optic response of a ring resonator according to an aspect of the present invention, with a reverse bias from 0 to 10 V. A tuning coefficient df/dV of 6 GHz/V may be obtained. With appropriate biasing, the close to critically coupled ring-resonator may act as a modulator with an equivalent $V_\pi$ of 2 V. An eye diagram at 1 Gb/s corresponding to a link incorporating such a ring modulator is shown in FIG. 15.

It will be apparent to those skilled in the art that various modifications and variations may be made in the apparatus and process of the present invention without departing from the spirit or scope of the invention. Thus, it is intended that the present invention cover the modification and variations of this invention provided they come within the scope of the appended claims and their equivalents.

What is claimed is:

1. A monolithic device for photonically coupling a first optical waveguide to a second optical waveguide, comprising:

an input optically coupled to said first waveguide;

a first 14.6%:85.4% multimode interference coupler optically coupled to said input;

a second 14.6%:85.4% multimode interference coupler optically coupled to said first coupler; and, an output optically coupled to said second coupler and said second waveguide;

wherein, when an optical signal is provided on said first waveguide, a given part of said signal is provided to said second waveguide dependent upon an angle between said first and second couplers.

2. The device of claim 1, wherein at least one of said first and second waveguides is a ring resonator.

3. The device of claim 1, wherein at least one of said first and second waveguides comprises a III–V semiconductor material system.

4. The device of claim 3, further comprising a amorphous silicon material coating at least a portion of said III–V semiconductor material system.

5. The device of claim 4, wherein said amorphous silicon material comprises hydrogenated amorphous silicon nitride.

6. The device of claim 1, wherein said angle induces a phase delay in signals traversing from said first coupler to said second coupler.

7. The device of claim 1, wherein at least a portion of the device is coated with an amorphous silicon material having a selectable refractive index.

8. A ring resonator based modulator array comprising:

a plurality of ring resonators;

a plurality of access waveguides; and a plurality of monolithic couplers providing arbitrary coupling ratios between corresponding ones of said access waveguides and ring resonators, respectively;

wherein, each monolithic coupler comprises:

a first 14.6%:85.4% multimode interference coupler optically coupled to one of said ring resonators; and a second 14.5%:85.4% multimode interference coupler optically coupled to a corresponding one of said access waveguides; wherein, said first coupler is positioned at a given angle to said second coupler, and a coupling ratio between said coupled ring resonator and waveguide is dependent upon said given angle.

9. The array of claim 8, further comprising an amorphous silicon material coating at least one of said ring resonators.

10. The array of claim 8, further comprising an amorphous silicon material coating at least one of said couplers.

* * * * *

UNITED STATES PATENT AND TRADEMARK OFFICE
CERTIFICATE OF CORRECTION

| | | |
|---|---|---|
| PATENT NO. | : 7,181,109 B2 | Page 1 of 1 |
| APPLICATION NO. | : 11/068477 | |
| DATED | : February 20, 2007 | |
| INVENTOR(S) | : Kwakernaak | |

It is certified that error appears in the above-identified patent and that said Letters Patent is hereby corrected as shown below:

On the title page of the patent, change the Assignee name as it appears at item (73) from "Sernoff Corporation" to --Sarnoff Corporation--

Signed and Sealed this

Fifteenth Day of May, 2007

JON W. DUDAS
*Director of the United States Patent and Trademark Office*